United States Patent
Smits

(10) Patent No.: US 11,434,802 B2
(45) Date of Patent: Sep. 6, 2022

(54) DYNAMIC EXCESS AMMONIA DETECTION WITH THE AID OF A SOFTWARE ALGORITHM IN ORDER TO ELIMINATE THE AMMONIA SENSOR

(71) Applicant: DEUTZ Aktiengesellschaft, Cologne (DE)

(72) Inventor: Volker Smits, Cologne (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 17/275,964

(22) PCT Filed: Aug. 16, 2019

(86) PCT No.: PCT/EP2019/000242
§ 371 (c)(1),
(2) Date: Mar. 12, 2021

(87) PCT Pub. No.: WO2020/057768
PCT Pub. Date: Mar. 26, 2020

(65) Prior Publication Data
US 2022/0056830 A1   Feb. 24, 2022

(30) Foreign Application Priority Data
Sep. 20, 2018 (DE) .......................... 102018007421.9

(51) Int. Cl.
*F01N 9/00* (2006.01)
*F01N 3/20* (2006.01)
(Continued)

(52) U.S. Cl.
CPC ........... *F01N 3/208* (2013.01); *F01N 13/009* (2014.06); *F01N 3/105* (2013.01); *F01N 13/008* (2013.01);
(Continued)

(58) Field of Classification Search
CPC .............. F01N 3/208; F01N 2560/026; F01N 2610/02; F01N 2900/1616
See application file for complete search history.

(56) References Cited

U.S. PATENT DOCUMENTS 9,528,417 B1 * 12/2016 Tuken .................... F01N 3/106
2009/0272099 A1    11/2009 Garimella et al.
(Continued)

FOREIGN PATENT DOCUMENTS

DE    102006051790 A1    5/2008
DE    102008043141 A1    5/2009
(Continued)

OTHER PUBLICATIONS

Machine translation of DE-102012220152-A1, accessed Dec. 18, 2021. (Year: 2021).*
(Continued)

*Primary Examiner* — Jonathan R Matthias
(74) *Attorney, Agent, or Firm* — Davidson, Davidson & Kappel, LLC

(57) ABSTRACT

An internal combustion engine has an exhaust gas aftertreatment system comprising in the given order in the flow direction of the exhaust gas: a device for metering ammonia and/or a compound that can be decomposed to form ammonia into the exhaust gas to be cleaned, as a reducing agent; one or more SCR catalysts, which form a first SCR unit; one or more SCR and/or ammonia oxidation and/or ammonia slip catalysts, which form a second SCR unit; and a $NO_x$ sensor in the exhaust gas tail pipe. An amount, to be metered into the exhaust gas, of ammonia and/or of the decomposable compound is set using the nitrogen oxide concentration in the exhaust gas tail pipe that is determined by the $NO_x$ sensor, and the occurrence or non-occurrence of an ammonia excess in the region of the $NO_x$ sensor can be determined
(Continued)

from the sensor signal of the $NO_x$ sensor by evaluating said sensor signal.

8 Claims, 3 Drawing Sheets

(51) Int. Cl.
 *F01N 13/00* (2010.01)
 *F01N 3/10* (2006.01)
(52) U.S. Cl.
 CPC .... *F01N 2560/026* (2013.01); *F01N 2610/02* (2013.01); *F01N 2610/1453* (2013.01); *F01N 2900/1616* (2013.01)

(56) References Cited

U.S. PATENT DOCUMENTS

| | | | | |
|---|---|---|---|---|
| 2009/0293457 | A1* | 12/2009 | Grichnik | F01N 3/208 60/286 |
| 2010/0180576 | A1* | 7/2010 | Wang | F01N 3/2066 60/276 |
| 2010/0242440 | A1 | 9/2010 | Garimella et al. | |
| 2011/0005202 | A1* | 1/2011 | Gady | F01N 11/00 60/276 |
| 2013/0255233 | A1* | 10/2013 | Yasui | F01N 3/10 60/286 |
| 2014/0298778 | A1 | 10/2014 | Riffle | |
| 2014/0301925 | A1 | 10/2014 | Korpics et al. | |
| 2015/0039256 | A1* | 2/2015 | Michalske | F01N 9/00 702/104 |
| 2015/0047415 | A1* | 2/2015 | Michalske | F02D 41/1495 73/23.31 |
| 2016/0108791 | A1 | 4/2016 | Charbonnel et al. | |

FOREIGN PATENT DOCUMENTS

| | | | |
|---|---|---|---|
| DE | 102010026373 A1 | 3/2011 | |
| DE | 102012220152 A1 * | 5/2014 | ......... F02D 41/1444 |
| DE | 102015206120 A1 | 10/2015 | |
| EP | 1054722 B1 | 12/2001 | |
| EP | 2299338 A1 | 3/2011 | |
| EP | 2317090 A1 | 5/2011 | |
| EP | 2317091 A1 | 5/2011 | |
| EP | 2439386 A1 | 4/2012 | |
| WO | WO2010062566 A2 | 6/2010 | |
| WO | WO2011139971 A1 | 11/2011 | |

OTHER PUBLICATIONS

International Search Report for PCT/EP2019/000242, dated Oct. 14, 2019.

* cited by examiner

DYNAMIC EXCESS AMMONIA DETECTION WITH THE AID OF A SOFTWARE ALGORITHM IN ORDER TO ELIMINATE THE AMMONIA SENSOR

BACKGROUND

For compliance with applicable European, United States, and Chinese emission legislation for so-called non-road diesel engines, it is imperative to equip these diesel engines with an exhaust emission control system. Typical exhaust emission control systems, in addition to a diesel oxidation catalytic converter for oxidative removal of carbon monoxide and hydrocarbons, and optionally a diesel particulate filter downstream therefrom, contain a denoxification unit. Units for selective catalytic reduction of nitrogen oxides, using a so-called selective catalytic reduction (SCR) catalytic converter, and a device for metering ammonia or a compound that is decomposable to form ammonia, as a reducing agent, into the exhaust gas stream to be cleaned are typical for denoxification of diesel engine exhaust gases in the commercial vehicle and non-road sectors. Preferred reducing agents are aqueous urea solution or ammonium carbamate solution, with urea solution being particularly preferred. Such SCR units are typically situated downstream from a diesel oxidation catalytic converter (DOC) and/or a diesel particulate filter (DPF) situated upstream.

Systems according to EP-B 1 054 722 or systems without diesel particulate filters (only DOC+SCR), among others, are used to meet the EU Stage IV or Tier 4f emission standards. In particular in the latter "open" systems, maximum SCR efficiencies must be achieved in all operating points, even after an extended service period, since for engines in which a system without diesel particulate filters is used for the exhaust emission control, the combustion process is tuned in such a way that preferably low particulate emissions occur at all times. This results in a significant increase in uncontrolled $NO_x$ emissions, so that nitrogen oxides conversions of greater than 90% in the SCR unit are necessary over the entire service life of the system in order to meet the regulatory emission limits.

The efficiencies of the SCR system are determined not only by the temperature and the mass flow across the SCR catalytic converter, but also by the $NO_2/NO_x$ ratio upstream from the SCR catalytic converter and by the quantity of the metered-in reducing agent. The $NO_2/NO_x$ ratio is set via the upstream DOC and/or DPF exhaust emission control units, values of 0.2 to 0.7, particularly preferably 0.4 to 0.6, being achieved.

An underdosing of the reducing agent (for example [alpha]=0.8, where [alpha] indicates the molar ratio of $NH_3$ to $NO_x$ in the exhaust gas to be cleaned upstream from the SCR catalytic converter) results in a limitation of the theoretically possible nitrogen oxides conversion, corresponding to the availability of the reducing agent (thus, for [alpha]=0.8, a maximum 80% nitrogen oxides conversion). Via an overdosing of the reducing agent ([alpha]>1), the thermodynamically possible, maximum nitrogen oxides conversions, which are still determined only by the material properties of the catalytic converter under the particular operating conditions (exhaust gas mass flow, temperature, $NO_2/NO_x$ upstream from the SCR), may be achieved across the SCR catalytic converter.

However, an overdosing of the reducing agent may result in ammonia breakthroughs through the SCR catalytic converter. Since ammonia is a toxic and environmentally harmful gas according to EU hazardous substance labeling, residual emissions must be strictly avoided.

Systems according to the prior art typically regulate the reducing agent metering with assistance from a model; i.e., the software stored in the engine control unit computes the stoichiometric requirement for reducing agents, based on the $NO_x$ content in the uncontrolled emissions and the previously experimentally ascertained efficiencies of the SCR catalytic converter in every conceivable operating point, and correspondingly controls the quantity of urea solution (so-called "pilot control quantity") to be metered in. This pilot control is hampered due to the fact that in particular SCR catalytic converters based on zeolites replaced with transition metals have a significant ammonia storage capacity. The quantity of ammonia that may be stored in the catalytic converter is a function of the operating temperature and the aging state of the catalytic converter. Accordingly, depending on the operating point, a portion of the metered-in quantity of reducing agent is used to fill the ammonia store in the catalytic converter. By use of the store, underdosings that briefly occur, in particular during dynamic operation, may be compensated for by reduction of the nitrogen oxides, contained in the exhaust gas, with ammonia that is desorbed from the store. The ammonia store must then be refilled by overdosing of reducing agent.

This storage behavior of the catalytic converter impedes the optimal adaptation of the pilot control model, since the complexity of the chemical-physical processes in the SCR catalytic converter are extremely difficult to describe mathematically. The model-assisted regulation of the reducing agent metering therefore has the disadvantage that, in particular during transient operation of the engine, maximum efficiencies of the SCR catalytic converter cannot be ensured in all operating points without ammonia breakthroughs.

SCR systems are known from the prior art in which ammonia breakthroughs downstream from the SCR catalytic converter are detected with the aid of an ammonia sensor.

Thus, WO 2010/062566 provides the design and the operating mode of an ammonia sensor.

DE 10 2006 051 790 provides an exhaust aftertreatment system for cleaning the exhaust gases of an internal combustion engine, including in the following order, in the flow direction of the exhaust gas, a first oxidation catalytic converter, a device for introducing a fuel into the exhaust system, a second oxidation catalytic converter, a diesel particulate filter, a device for injecting a reducing agent that is active with regard to the reduction of nitrogen oxides, an SCR catalytic converter, and optionally an (ammonia) slip catalytic converter having oxidation catalytic activity. An ammonia sensor for improving the regulation of the addition of the reducing agent or for diagnostic purposes may be provided downstream from the SCR catalytic converter.

EP-A 2 317 091 provides an exhaust emission control system, including in the following order, in the flow direction of the exhaust gas, an oxidation catalytic converter, an exhaust gas pipe with a metering device for urea solution, and an SCR catalytic converter. A temperature sensor is integrated into the SCR catalytic converter. An ammonia sensor for detecting the ammonia concentration in the exhaust gas downstream from the SCR catalytic converter is provided downstream from the SCR catalytic converter. An ammonia oxidation catalytic converter may be situated downstream from the ammonia sensor. In the system provided in EP-A 2 317 091, a quantity of urea solution to be metered (pilot control quantity) is determined and metered in as a function of the rotational speed and the torque of the engine. At the same time, the ammonia storage capacity of the SCR catalytic converter is computed based on the time delay between the start of metering and the start of ammonia slip. If ammonia slip is indicated via the ammonia sensor downstream from the SCR catalytic converter, the actual quantity of urea solution to be metered in is reduced with respect to the pilot control quantity. If the computation of the ammonia storage capacity of the SCR catalytic converter results in a value that is less than a reference value stored in the control software, the actual quantity of urea solution to be metered in is increased with respect to the pilot control quantity.

EP-A 2 317 090 provides a method for operating an SCR system, in which a preparatory cessation of the metered quantity of reducing agent takes place when ammonia breakthroughs through the SCR catalytic converter are to be expected due to the operating conditions. Such changes in the operating conditions include in particular changes in the exhaust gas mass flow and/or an increase in the exhaust gas temperature. EP-A 2 317 090 also provides a method for recognizing the risk of an ammonia slip with the aid of an ammonia sensor situated between two SCR catalytic converters. If a predefined ammonia slip is exceeded downstream from the first upstream SCR catalytic converter, the reducing agent metering is switched off.

DE 10 2008 043 141 provides an exhaust emission control system for a diesel internal combustion engine, including in the following order, in the flow direction of the exhaust gas, a diesel oxidation catalytic converter, a device for metering ammonia into the exhaust system, an SCR catalytic converter, a $NO_x$ sensor for detecting nitrogen oxides in the exhaust gas, an ammonia oxidation catalytic converter, a device for metering water into the exhaust system, and an ammonia sensor. If an ammonia concentration that exceeds a predefined value is detected in the exhaust gas downstream from the ammonia oxidation catalytic converter with the aid of the ammonia sensor, water is metered into the exhaust system downstream from the ammonia oxidation catalytic converter in order to "capture" the ammonia present at the tail pipe, and thus prevent the emission of the ammonia into the atmosphere.

US 2009/0272099 and US 2010/0242440 provide exhaust aftertreatment systems that include in the following order, in the flow direction of the exhaust gas, an oxidation catalytic converter, a diesel particulate filter, a device for metering in a reducing agent such as ammonia or urea solution, an SCR catalytic converter, and an ammonia oxidation catalytic converter. Ammonia sensors may be situated downstream from the ammonia oxidation catalytic converter, upstream from the SCR, and/or upstream from the ammonia oxidation catalytic converter. These ammonia sensors are supplemented by $NO_x$ sensors for detecting the nitrogen oxides content in the exhaust gas upstream from the diesel oxidation catalytic converter, downstream from the SCR, and/or downstream from the ammonia oxidation catalytic converter. With the aid of these sensor signals, the actual reducing agent metering rates are adapted in such a way that suboptimal reducing agent metering quantities due to errors or discrepancies in the pilot control model (for example, modeling errors, deviations in the actual efficiencies due to catalytic converter aging or sensor aging, deviations in the reducing agent concentration, delays in injection) are corrected.

WO 2011/139971 provides a method for operating an SCR system that includes two SCR catalytic converters situated in succession in the flow direction of the exhaust gas, and an ammonia sensor between the two SCR catalytic converters and a $NO_x$ sensor downstream from the second SCR catalytic converter situated downstream in the flow direction. The method is characterized in that the default value of the ammonia concentration in the exhaust gas that prevails between the two SCR catalytic converters, and that is determined with the aid of the ammonia sensor, is changed or adapted as a function of the $NO_x$ concentration in the exhaust gas downstream from the second SCR catalytic converter, determined with the aid of the $NO_x$ sensor.

SUMMARY OF THE INVENTION

It is an object of the present disclosure to provide a method for reducing nitrogen oxides from diesel engine exhaust gases with the aid of selective catalytic reduction, the method making maximum use of the theoretically possible efficiencies of the SCR catalytic converters due to the maximum possible provision of ammonia and/or a compound that is decomposable to form ammonia, as reducing agent, breakthroughs of ammonia through the SCR system being systematically avoided, and at the same time, the method being characterized by a preferably low application and data entry effort.

A method is provided for reducing nitrogen oxides from diesel engine exhaust gases with the aid of an exhaust aftertreatment system, including in the following order, in the flow direction of the exhaust gas:
  a device for metering ammonia and/or a compound that is decomposable to form ammonia, as reducing agent, into the exhaust gas to be cleaned,
  one or multiple SCR catalytic converters that form(s) a first SCR unit,
  one or multiple SCR catalytic converters and/or an ammonia oxidation catalytic converter that form(s) a second SCR unit, and
  a nitrogen oxide sensor ($NO_x$ sensor) for determining the concentration of the nitrogen oxides ($NO_x$) in the tail pipe.

BRIEF SUMMARY OF THE DRAWINGS

The present invention is explained by way of example with reference to the appended drawings.

DETAILED DESCRIPTION

In most cases, a component of the exhaust emission control system forms the selective catalytic reduction (SCR). The SCR exhaust aftertreatment is used for reduction of the nitrogen oxides. The reduction is achieved via the metering of a urea solution (AdBlue or urea/DEF, for example), which subsequently reacts to form ammonia (NH3).

Figure 1:
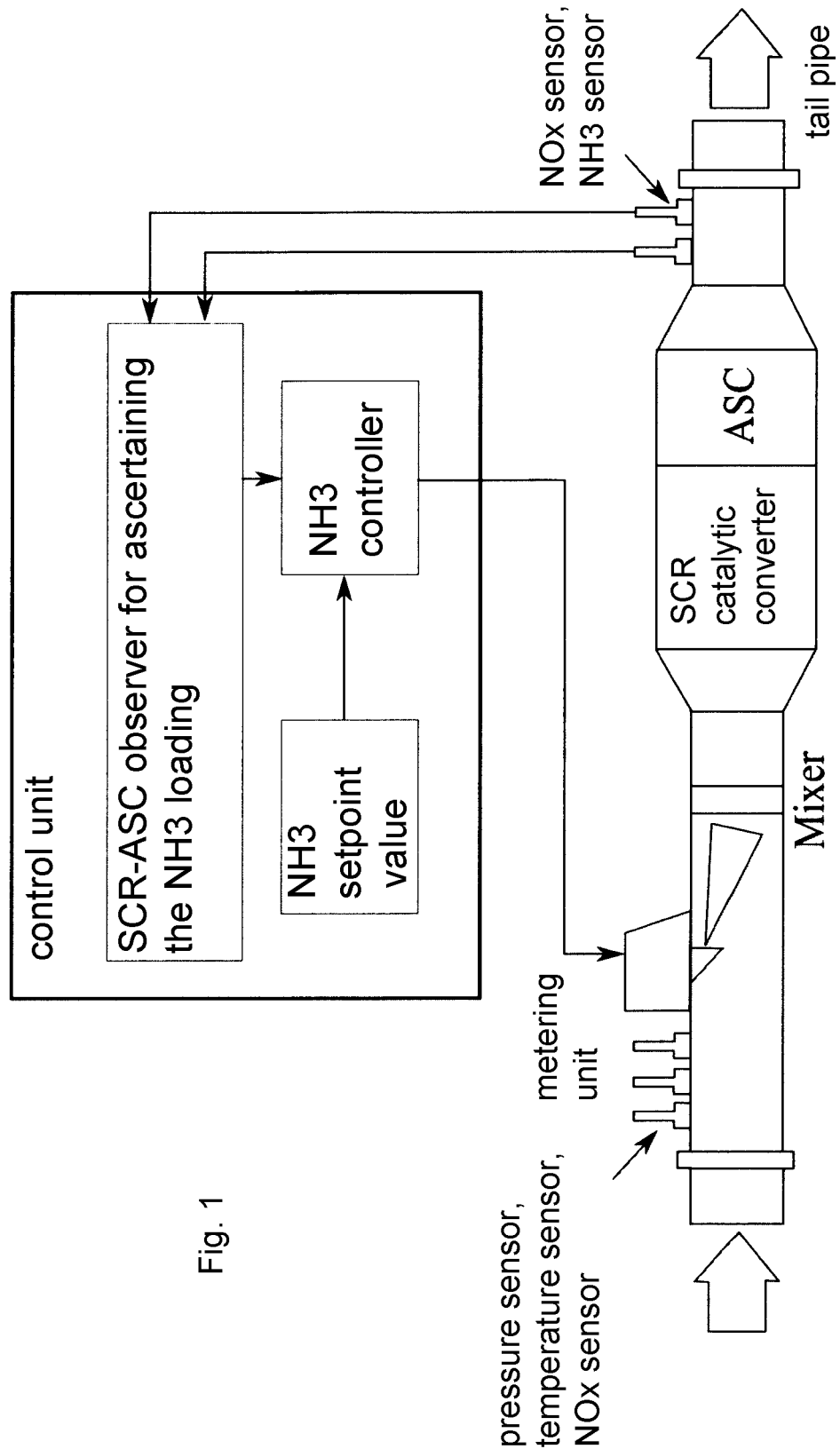
FIG. 1 schematically shows the design of an exhaust aftertreatment system for carrying out the method according to the present disclosure, and an overview of the SCR control.

In the SCR catalytic converter, the nitrogen oxides of the exhaust gas react with the ammonia to form primarily nitrogen and water at optimal efficiency. In addition to the temperature, the mass flow, and the $NO_2/NO_x$ ratio, the efficiency of the SCR system also depends greatly on the quantity of urea metered in. In the event of an underdosing (λ<1), the SCR catalytic converter is not able to convert the nitrogen oxides, resulting in greater nitrogen oxides emissions. However, in the event of an overdosing of the reducing agent (λ>1) an ammonia excess results, which is emitted from the catalytic converter. Due to the toxic and environmentally harmful properties of ammonia, the quantity of ammonia emissions is also regulated and is to be strictly avoided. Although portions of the excess ammonia may be converted back into nitric oxide (NO) by the use of an ammonia slip catalyst (ASC), the conversion rate is not always sufficient to completely convert the excess ammonia into nitric oxide. For detecting the remaining excess ammonia downstream from the ASC, the approach thus far has been to install an NH3 sensor from DELPHI (see FIG. 1). By monitoring the excess ammonia downstream from the ASC, optimal use may be made of the efficiency of the SCR system with regard to the metering quantity, without risking too large an ammonia excess, since in the event of a detection of ammonia due to overdosing by the SCR control, the sensor value is used for correcting the variable of the SCR control.

The novel approach involves a recognition of the excess ammonia with the aid of a software algorithm. The advantages of the novel approach over the previous approach are the savings in purchase and installation costs of the NH3 sensor, and the option for likewise recognizing the nitric oxide formation due to excess ammonia downstream from the SCR.

The software algorithm recognizes the excess ammonia based on an analysis of the nitrogen oxide sensor from CONTINENTAL, for example, which is installed downstream from the SCR catalytic converter. The analysis utilizes the cross-sensitivity of the nitrogen oxide sensor to ammonia, and determines the normalized amplitude spectrum via the fast Fourier transform (FFT, Radix-2 Decimation in Time) and via a normalization. The fast Fourier transform (FFT) is an algorithm for efficiently computing the discrete Fourier transform (DFT). By use of the DFT, a digital signal may be broken down into its frequency components, which are then analyzed.

The inverse fast Fourier transform (IFFT) analogously results for the discrete inverse Fourier transform. The same algorithms are used with the IFFT, but with conjugated coefficients.

The FFT has numerous applications in the fields of engineering, natural sciences, and applied mathematics. In addition, it is used in mobile radio technologies such as UMTS and LTE and in wireless data transmission, for example in WLAN wireless network technology. The algorithm from Cooley and Tukey (Radix-2) is a traditional divide-and-rule method. The requirement for its use is that the number of supporting points or sampling points is a power of two. However, since the number of such points may generally be freely selected within the scope of measuring methods, this is not a severe limitation.

The algorithm is based on the observation that the computation of a DFT of value 2n may be broken down into two computations of DFT of value n (via the vector with introduction of the even or odd indices); after the transformation, the two partial results are to be recombined into a Fourier transform of value 2n.

Since the computation of a DFT having one-half the length requires only one-fourth the complex multiplications and additions of the original DFT, and, depending on the length of the output vector, this rule may be applied multiple times in succession, the recursive application of this basic concept ultimately allows a computation in time; Landau symbols are used in mathematics and in information technology to describe the asymptotic behavior of functions and consequences. In information technology, they are used in the analysis of algorithms, and indicate a measure for the number of elementary steps or memory units as a function of the value of the input variables. They use the complexity theory to subsequently compare various problems concerning how "difficult" or complicated they are to solve. It is said that "difficult problems" grow exponentially with the instance or more quickly, and for "easy problems" an algorithm exists whose runtime growth may be limited by the growth of a polynomial. It is referred to as (non) polynomially solvable. To save trigonometric computing operations, the properties of the roots of unity from the Fourier matrix may be additionally utilized for the FFT. The value range used here is in interval [0, 1]. Interval [0, 1] refers to the subsequent normalization of the amplitude spectrum. For the normalized amplitude spectrum, a quotient is subsequently ascertained which determines the ratio between higher-frequency and lower-frequency components. This takes place in the form of an integral formation over the normalized amplitude spectrum for the two frequency ranges with the aid of Simpson's rule. Simpson's rule or Simpson's formula (named after Thomas Simpson), sometimes also called Kepler's barrel rule (named after Johannes Kepler), is a numerical integration method in which an approximation to the integral of a function f(x) in interval [a, b] is computed by approximating the f(x) function, which is difficult to integrate, by a precisely integratable parabola P(x).

Parabola P(x) is fitted to points a, b, m=(a+b)/2 as an interpolation polynomial, using function values. The integral is then approximated by the integral of the parabola. Simpson's rule is thus a so-called closed Newton-Cotes formula. For approximation S(f) of $$\int_a^b f(x)dx$$

the following is then obtained:

$$S(f) = \frac{b-a}{6} \cdot \left( f(a) + 4f\left(\frac{a+b}{2}\right) + f(b) \right)$$

If quotient qint is above a certain threshold value, the software algorithm indicates an ammonia excess.

In addition, a dynamic recognition is achieved via high pass filtering with subsequent absolute value and average value formation of the nitrogen oxides signal of the nitrogen oxide sensor upstream from the SCR catalytic converter. By use of the value from the dynamic recognition, on the one hand the analysis via the fast Fourier transform is enabled, and on the other hand the value of the threshold value is adapted and compared to quotient qint.

The adaptation takes place corresponding to the existing dynamics of the nitrogen oxides signal upstream from the SCR catalytic converter, via a piece-by-piece linear interpolation. The parameters for the division into the two frequency ranges (lower- and higher-frequency components), the threshold value for enabling FFT analysis qdyn, as well as the parameters for adapting the threshold value for the comparison to quotient qint are optimized using a genetic algorithm (GA) based on representative customer cycles. Genetic algorithms (GAs) belong to the class of evolutionary algorithms (EAs). EAs are heuristic search algorithms that are based on Darwin's theory of evolution (variation, reproduction, and selection) and that simulate this principle on the technical level to solve optimization problems iteratively.

For this purpose, a population from a number of individuals is built up or initialized. Each individual represents one possible solution. The suitability or also evolutionary fitness of each individual is subsequently determined according to a quality function. The algorithm is stopped if the abort criterion is reached. Examples of abort criteria are the reaching of a target value of the quality function or the number of iterations of the algorithm. If the abort criterion is not satisfied, a new population for the next iteration, also referred to as a generation in the evolutionary context, is created.

The primary portion of the analogy to Darwin's theory of evolution occurs at this point. Of the existing population, the individuals having the best fitness are selected for the new population and utilized for the recombination. The recombination utilizes components (genes) of the selected individuals, also referred to as "parents," to create a new individual. In the context of the evolutionary algorithms, the new individual is also referred to as a descendant or child. For creating the new population, it is also possible to subsequently mutate the individuals after the recombination. The mutation may take place, for example, in such a way that random individuals are selected and individual genes of these individuals are further altered. The fitness of the new individuals is now determined, and a selection is subsequently made as to which individuals, with regard to their evolutionary fitness, take part in the next generation. After the new population is created, the abort criterion is once again checked, and the procedure using the algorithm is continued until the abort criterion is satisfied.

The basic sequence is briefly summarized once again below:
1. Initialization of a population
2. Evaluation of the population
3. Checking the abort criterion:
satisfied→stop algorithm
not satisfied→go to the next step
4. Creation of the new population for the next generation
selection of the candidates for the recombination
recombination
mutation
evaluation of the new individuals
selection for determining the new population for the next generation
5. Go to step 3

The fitness function for optimizing the NH3 detection results from the sum of the matches between the detection of the virtual NH3 sensor with the comparison of the measured ammonia at the test stand. In other words, if the NH3 within the evaluated measuring window is on average above 10 ppm, the reference indicates a logical 1, and otherwise, a 0. The virtual parameterization of the NH3 sensor is now designed by the GA in such a way that the GA matches the reference preferably often.

Figure 2:
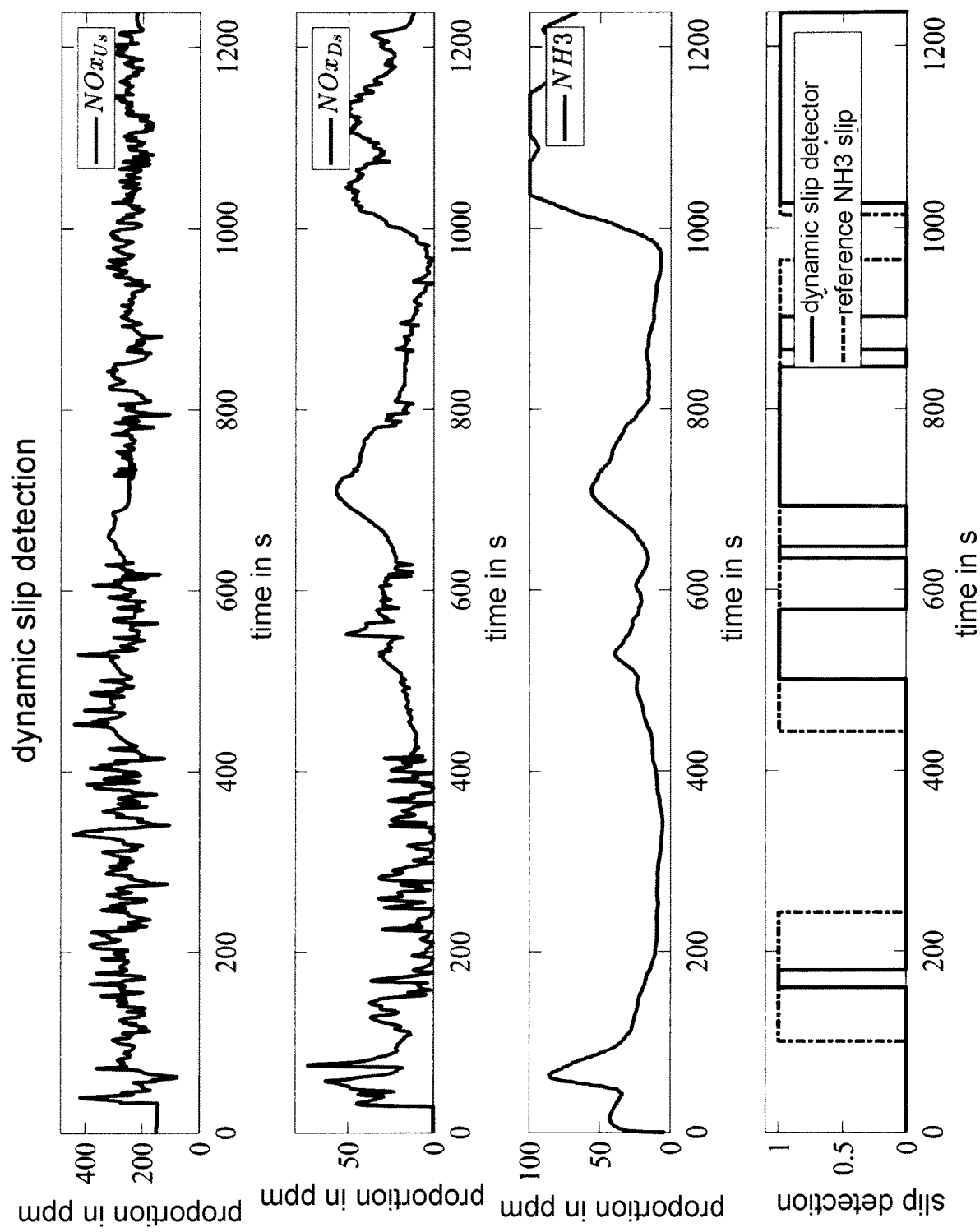
FIG. 2 shows a comparison of the excess ammonia detection for an NRTC with overstoichiometric metering.
Figure 3:
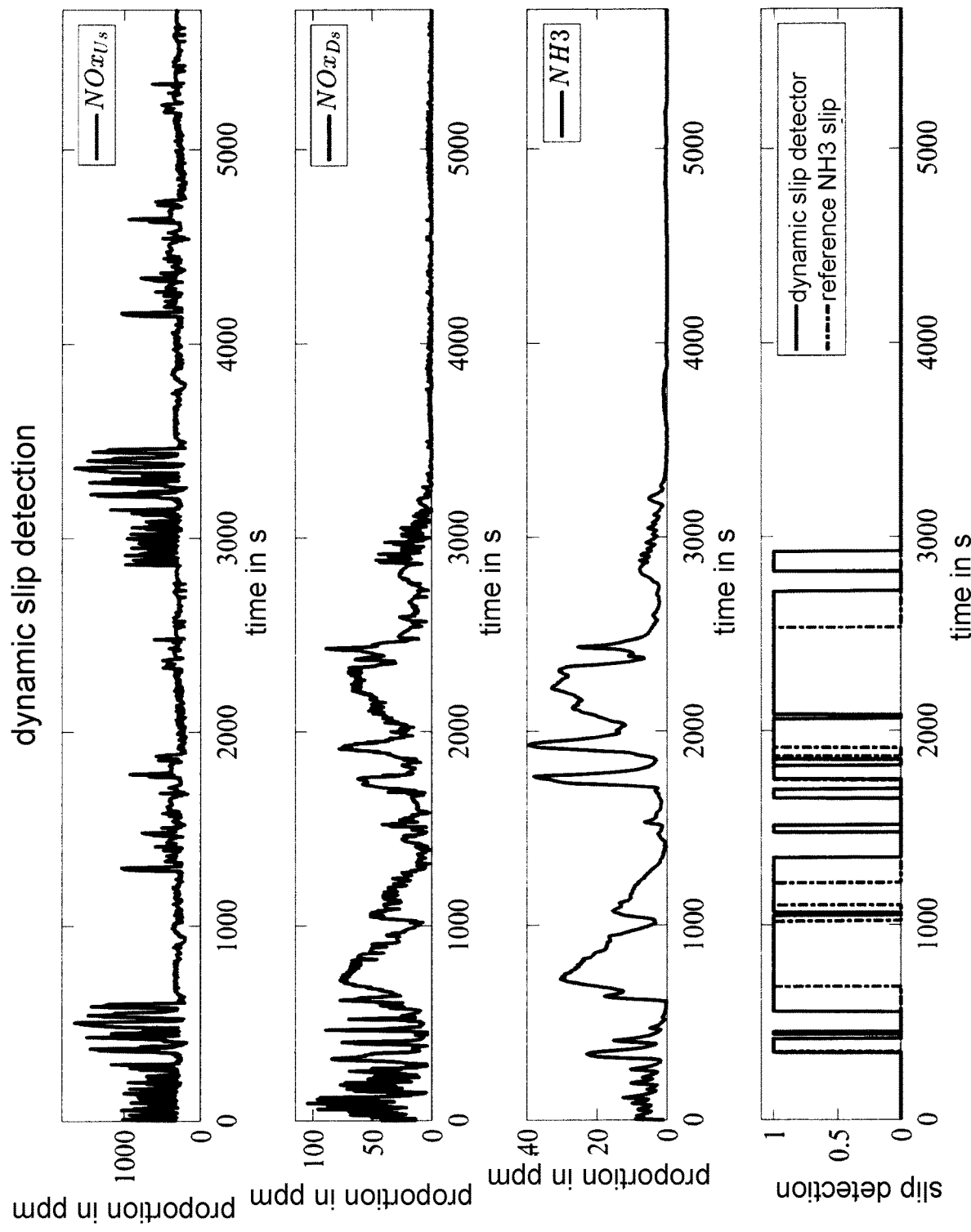
FIG. 3 shows a comparison of the excess ammonia detection for the "unit drive cycle" with overstoichiometric metering.

The two figures described below (FIGS. 2 and 3) show, on the one hand, the "unit drive cycle," made up of five customer cycles, and, on the other hand, the non-road transient cycle (NRTC). For both figures, the detection result of the software solution is compared to the detection result of the ammonia sensor from Delphi, in each case in the bottom diagram of the figures. The sensor indicates an ammonia excess when the sensor has measured an ammonia value of 10 ppm on average over a period of 100 s.

The NRTC illustrated here has been run with an overstoichiometric metering of $\lambda=2.6$. The detection of the software solution largely agrees with the detection of the sensor, and recognizes all excess ammonia situations and all situations in which on average there is no excess ammonia greater than 10 ppm. At the start of the "unit drive cycle," the default of $\lambda=2$ has been selected to simulate a strong overdosing. The metering has subsequently been reduced step by step to $\lambda=1$. This is apparent in FIG. 3 in the second portion of the cycle starting at 3000 s. The sensor and also the software algorithm recognize the range of strong overdosing and of stoichiometric metering.

In summary, it may be stated that the software solution provides a result comparable to that of the NH3 sensor with regard to the qualitative statement of whether or not there is an ammonia excess, and is therefore suitable for use in the overall control strategy for the SCR catalytic converter for recognizing an ammonia excess.

What is claimed is:

1. An internal combustion engine including an exhaust aftertreatment system, comprising in the following order, in the flow direction of the exhaust gas:
   a first nitrogen oxide sensor;
   a metering device for metering ammonia and/or a compound decomposable to form ammonia, as a reducing agent, into the exhaust gas to be cleaned;
   a first selective catalytic reduction (SCR) unit including at least one SCR catalytic converter;
   a second SCR unit including at least one SCR catalytic converter and/or at least one ammonia oxidation catalytic converter and/or at least one ammonia slip catalyst; and
   a second nitrogen oxide sensor for determining a concentration of nitrogen oxides in a tail pipe;
   the internal combustion engine further comprising a control unit configured to control the metering device such that a quantity of ammonia and/or of the compound decomposable to form ammonia that is to be metered into the exhaust gas is set with the aid of the second nitrogen oxide sensor in the tail pipe, and the quantity of ammonia and/or of the compound decomposable to form ammonia that is to be metered into the exhaust gas being ascertained from a sensor signal of the second nitrogen oxide by evaluating the sensor signal via a cross-sensitivity of the second nitrogen oxide sensor to the concentration of nitrogen oxides as well as an occurrence or nonoccurrence of excess ammonia being ascertainable in the exhaust gas,
   wherein the control unit is programmed with an algorithm for recognizing the excess ammonia that compares lower-frequency components to higher-frequency components of the second nitrogen oxide sensor by forming a ratio of the lower-frequency components to the higher-frequency components with the aid of a quotient.

2. The internal combustion engine as recited in claim 1, wherein the algorithm examines solely frequencies of the second nitrogen oxide sensor.

3. The internal combustion engine as recited in claim 1, wherein the algorithm for recognizing the excess ammonia computes the quotient of the lower-frequency components to the higher-frequency components and compares the quotient to a threshold value to establish the occurrence or nonoccurrence of excess ammonia in the exhaust gas, the threshold value that is compared to the quotient being determined via a linear interpolation with regard to dynamics of the signal of the first nitrogen oxide sensor.

4. The internal combustion engine as recited in claim 1, wherein a parameterization of the algorithm is optimized for recognizing the excess ammonia via a genetic algorithm which optimizes parameters of a linear interpolation of a threshold value with regard to existing dynamics of the first nitrogen oxide sensor upstream from the SCR catalytic converter, which is compared to the quotient of the frequency components, optimizes the frequency range which determines the region of the lower-frequency and higher-frequency components, and optimizes the threshold value for enabling the analysis based on the existing dynamics of the first nitrogen oxide sensor, based on measured data.

5. The internal combustion engine as recited in claim 1 wherein, a parameterization of the algorithm is designed to recognize the excess ammonia with the aid of a genetic algorithm, based on measured data.

6. The internal combustion engine as recited in claim 1 wherein the algorithm, for ascertaining a frequency analysis, determines a normalized amplitude spectrum of the second nitrogen oxide sensor with the aid of a fast Fourier transform and subsequent normalization.

7. The internal combustion engine as recited in claim 1 wherein the algorithm determines lower-frequency and higher-frequency components of a normalized amplitude spectrum of the second nitrogen oxide sensor with the aid of a fast Fourier transform and subsequent normalization, and determines the lower-frequency and higher-frequency components via an integral formation over the normalized amplitude spectrum with the aid of a quotient, using Simpson's rule for the integration.

8. The internal combustion engine as recited in claim 1 wherein the algorithm ascertains the dynamics of the first nitrogen oxide sensor via high pass filtering with subsequent absolute value and average value formation.

* * * * *